May 27, 1969     W. H. HARRIS     3,445,934

DENTAL OPERATORY AND VALVE USED THEREIN

Filed May 23, 1966

INVENTOR.
WILLIAM H. HARRIS
BY
Dunlap and Laney
ATTORNEYS

May 27, 1969     W. H. HARRIS     3,445,934

DENTAL OPERATORY AND VALVE USED THEREIN

Filed May 23, 1966

INVENTOR.
WILLIAM H. HARRIS
BY
Dunlap and Laney
ATTORNEYS

United States Patent Office 3,445,934
Patented May 27, 1969

3,445,934
DENTAL OPERATORY AND VALVE
USED THEREIN
William H. Harris, 4513 S. Pennsylvania,
Oklahoma City, Okla. 73119
Filed May 23, 1966, Ser. No. 552,027
Int. Cl. A61c 17/00, 19/00; F16k 5/04
U.S. Cl. 32—22                                  15 Claims

ABSTRACT OF THE DISCLOSURE

A dental operatory which includes a vertical standard and an instrument support member connected to the standard through a universal joint and arms which permit universal movement of the instrument support member. The instrument support member detachably supports a plurality of air driven, water receiving instruments and a fluid distributing valve. The valve has an axially bored, cyclindrical valve housing and rotatably surrounds a central core. The valve housing and core both contain axially extending, parallel passageways opening at coplanar end faces disposed on one side of the instrument support member, and selectively communicable through registering radial passageways in housing and core. A valve operator knob is disposed on the opposite side of the instrument support member from the coplanar end faces and openings therein so that in rotating the core to operate the valve, the dentist encounters no interference from flexible fluid conduits connected between the openings to the valve passageways and the dental instruments.

---

This invention relates to an improved dental operatory and to a novel valve having particular utility therein. More particularly, but not by way of limitation, the present invention relates to a valve for selectively distributing two fluids to a plurality of pairs of ports which are connected to different fluid powered instruments of the type used by dentists, such valve being adapted for mounting in the arms of a dental operatory, and easily manipulatable by the dentist.

In the practice of dentistry, a number of instruments are used which are driven by compressed air, and which, during their use, dispense a stream of water for cooling purposes. These instruments are generally located on a swinging arm which is within reach of the dentist, and each of the instruments is individually supported on the arm and is connected by longated flexible air and water inlet conduits which permit it to be extended a considerable distance from the swinging arm so as to reach to the mouth of a patient. In some previous dental operatory arrangements, a manifold valve has been provided to receive air and water through main inlet conduits connected to the source of these fluids, and to distribute the air and water into which ever of the instruments the dentist may be using at a particular time. The valves of this type which have been provided have frequently been difficult to utilize, and sometimes require both hands of the dentist to shift or throw the valve, or have required an off balance effect by the dentist to move the valve operator with the result that the dentist is distracted from the work being done upon the teeth of the patient, and is slowed down in the overall performance of his services. Moreover, such valves have frequently been complex in construction and expensive to manufacture. In some instances, the valves have been permanently or stationarily mounted on the swinging operatory arm so that they cannot be removed from the arm for cleaning, repair or replacement.

The present invention provides an improved valve for use in dental operatories, which valve performs the function of distributing air and water from common source conduits through a plurality of pairs of air and water conduits, each of which is connected to an air driven, water dispensing dental instrument. Broadly described, the valve of the invention comprises a valve body having a cylindrical bore therethrough for receiving a rotating valve core as hereinafter described, the valve body further having a plurality of axially extending, circumferentially spaced air and water passageways extending parallel to said cylindrical bore and, in the preferred embodiment of the invention, disposed between the cylindrical bore and the outer surface of the valve body. The air and water passageways open at one end of the valve body and are of shorter length than the cylindrical bore. A plurality of circumferentially spaced, radially extending ports are extended through the valve body from the cylindrical bore to each of the air and water passageways so that all of the passageways are in communication with the cylindrical bore. All of these radially extending ports lie in substantially the same plane.

The rotating valve core to which reference has been made is cylindrical in configuration and fits snugly in the cylindrical bore in the valve body. The core carries a turning element, such as a knob or handle, at one end thereof and outside the cylindrical bore of the valve body. At its other end a pair of passageways open into the core and extend axially therein and parallel to the first-mentioned passageways and the axial bore. Radial ports extend radially from the inner ends of these two passageways in the core to the outer peripheral surface thereof and are axially positioned in the core so at to lie in substantially the same plane as the plane containing the first-mentioned radial ports which are located in the valve body. The relative positions of the radial ports in the body and those in the core are such that the two core ports may be aligned with any desired pair of radial ports in the valve body by rotation of the core.

There is further provided in the valve, means for preventing axial movement between the core and the valve body, and means cooperating with the body and the core for limiting the rotative movement of the core in the body, and for providing an indication of the port alignment between the core and the body.

The described valve construction permits the valve to be easily mounted in a swivelly mounted operatory arm, and in such a way that all conduits for conveying fluid to and from the valve are disposed to the rear of the valve and out of the way of the dentist. The valve can be operated easily with only two fingers, and cannot be easily switched to an improper or inoperative position.

In a different aspect, the invention relates to the described valve in combination with certain novelly arranged elements of a dental operatory. This combination includes a vertically extending standard having a first horizontal arm pivotally attached thereto, a second arm pivotally attached to the free end of the first horizontal arm, a swivel arm connected to the second arm through a ball and socket connection, and an instrument support member. The instrument support member is apertured to receive a plurality of dental instruments, and the valve of the invention is detachably mounted in said instrument support arm in close proximity to the instrument receiving apertures in the support arm, thus facilitating connection of air and water conduits between the valve and these instruments. The valve is mounted in the instrument support arm so that all the air and water conduits or lines connected thereto are disposed at the rear side of the valve support arm, and thus offer no interference with the movements of the dentist.

From the foregoing description, it will be apparent that an important object of the present invention is to provide an improved valve for distributing to a plurality of pairs of outlet conduits, two fluids received from a source remote from the valve.

Another object of the invention is to provide an improved rotary valve having special utility in controlling the flow of air and water to various instruments used in the practice of dentistry.

A further object of the invention is to provide a rotary valve having multiple inlet and outlet ports entering and leaving the valve in a common direction at one side thereof.

An additional object of the invention is to provide improved dental operatory apparatus including pivotally and swivelly mounted arms supporting an instrument support member, which member carries a novel air and water dispensing valve and a plurality of dental instruments connected to the valve and receiving air and water therefrom.

Another object of the invention is to provide in a dental operatory of the type including a plurality of air driven, water dispensing instruments, means for minimizing the exposure of air and water lines and the interference which such lines offer to the work of the dentist.

In addition to the foregoing described objects and advantages, additional objects and advantages will become apparent from the following detailed description of the invention when it is read in conjunction with the accompanying drawings which illustrate the invention.

Figure 1:
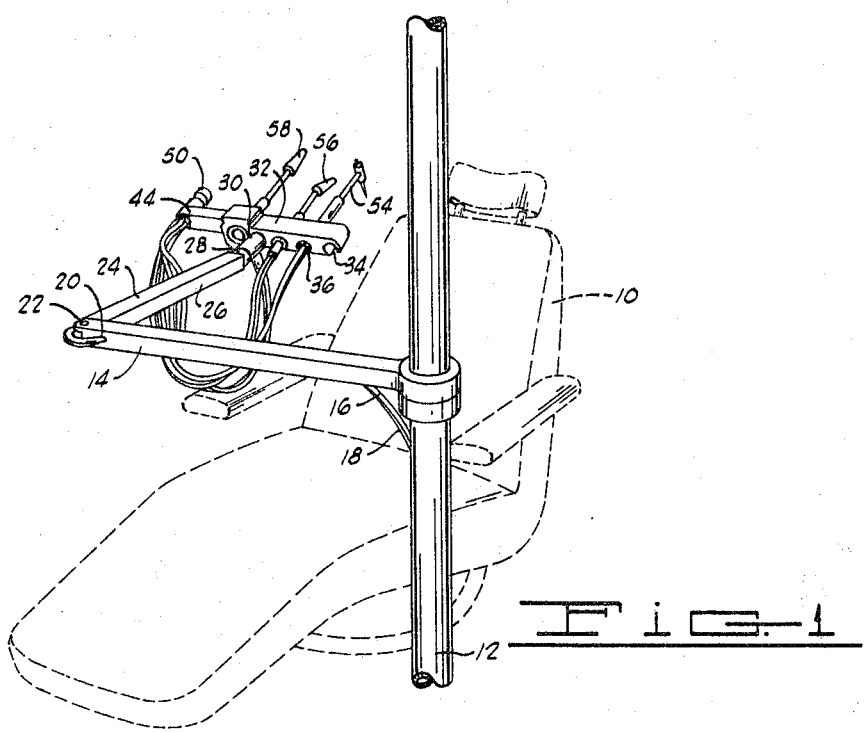
FIGURE 1 is a perspective view of a dental operatory illustrating the manner in which the valve of the present invention is mounted in the operatory and is connected between a source of air and water, and a plurality of air driven, water dispensing instruments.
Figure 2:
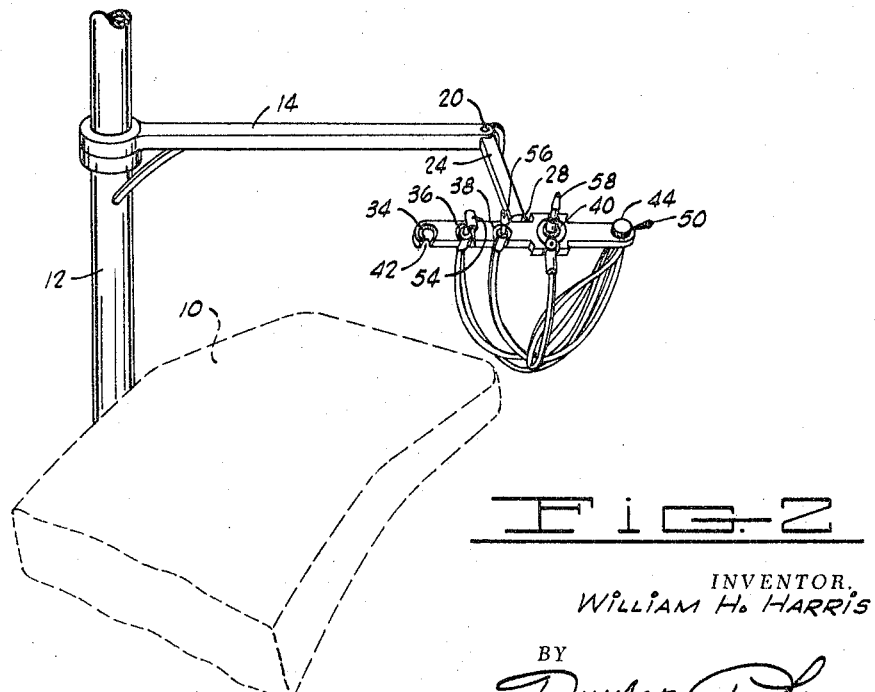
FIGURE 2 is a perspective view of the apparatus depicted in FIGURE 1, but showing the apparatus as it appears when viewed from a different vantage point.

Referring now to the drawings in detail, and particularly, to FIGURE 1, a dental chair 10 is positioned, as is conventional practice, alongside an upright or vertically extending standard 12 which carries intermediate its length, a swivelly or pivotally mounted horizontal arm 14. The standard 12 and horizontal arm 14 are both hollow or tubular, and air and water conduits 16 and 18 extend upwardly through the standard 12 and outwardly through the horizontal arm 14. An opening 20 is provided adjacent the end of the horizontal arm to permit the air and water conduits 16 and 18 to be passed to the outside thereof and around a pivotal joint 22 by means of which the horizontal arm 14 is connected to one end of a second horizontal arm 24. At its other end 26 the second horizontal arm 24 is connected through a ball and socket joint 28 (see FIGURE 2) to a short swivel arm 30 upon which is rigidly mounted an instrument support member 32. The instrument support member 32 is provided with a plurality of apertures or bores 34, 36, 38 and 40 which are lined with a relatively soft flexible material, such as plastic or sponge rubber, which are provided with small openings 42 in the lower side thereof. An opening 44, which is completely surrounded in the circumferential sense by the instrument support member 32, is provided adjacent that end of the instrument support member which is normally positioned to one side of the chair 10.

The novel valve of the present invention is designated by reference numeral 50 and is positioned in the opening 44 adjacent one end of the instrument support member 32. The valve 50 is generally cylindrical in configuration and is pressed into the opening 44 and secured therein when in use by a suitable set screw (not shown). The air and water lines 16 and 18 are extended from the pivotal connection 22 to the valve 50, and supply air and water thereto from a source remote from the operatory area and not shown in the drawings. Mounted in the open-sided apertures 36, 38 and 40 are a plurality of dental instruments 54, 56 and 58 of conventional type which are air driven in operation, and which, in use, supply a stream of water to the portion of the patient's mouth or teeth at which the instruments are being used. Interconnecting each of the instruments 54, 56 and 58 to the valve 50 are an air line and water line, thus in the illustrated embodiment of the invention, providing three pairs of air and water lines leading from the valve 50 to the three instruments 54, 56 and 58 illustrated in the drawings. It should be noted at this point that, though three of the instruments are shown connected to the valve 50 and receiving a supply of air and water therefrom, the principle of the invention is applicable to greater or fewer numbers of dental instruments, and the valve 50 can be adapted to supply the necessary fluids to varying numbers of instruments as may be desired.

The specific configuration of the novel valve 50 of the invention is best illustrated in FIGURES 3–9 of the drawings. The valve may be broadly described as including a rotating core portion designated generally by reference character 62 and a fixed or stationary jacket portion designated generally by reference character 64. Referring initially to the jacket portion 64, this portion of the valve 50 comprises a cylindrical body 66 having a cylindrical bore 68 formed concentrically therein and extending from one end of the body to the other. The body 66 is further characterized in having a radially extending aperture (not seen) formed therethrough into which a key screw 70 is threaded and extends radially inwardly into the bore 68 for a purpose hereinafter described.

Figure 3:
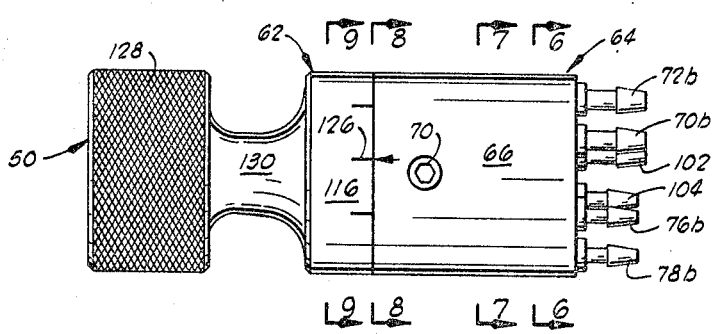
FIGURE 3 is a view in elevation of the valve of the present invention.
Figures 4, 6, 7:
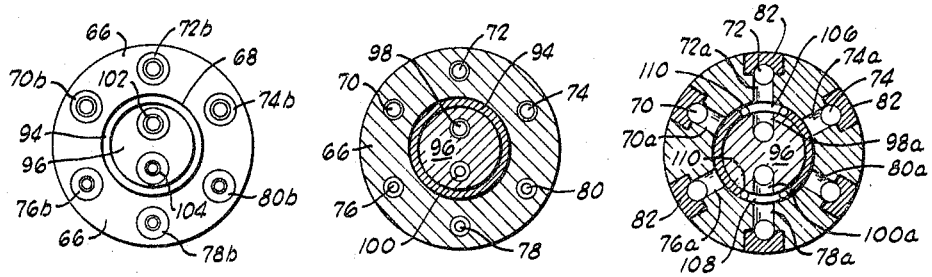
FIGURE 4 is an end view of the valve as it appears when viewed from the end on which are located the air and water inlet and discharge ports.
FIGURE 6 is a sectional view taken along line 6—6 of FIGURE 3.
FIGURE 7 is a sectional view taken along line 7—7 of FIGURE 3.
Figures 8, 9:
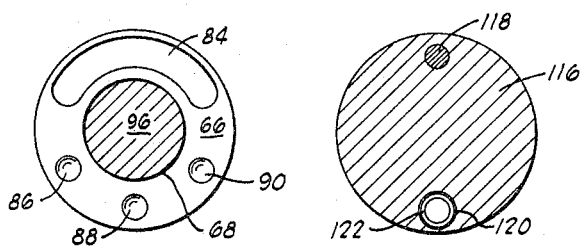
FIGURE 8 is a sectional view taken along line 8—8 of FIGURE 3.
FIGURE 9 is a sectional view taken along line 9—9 of FIGURE 3.

At positions between the bore 68 and the outer cylindrical periphery of the body 66, a plurality of axially extending air and water pasageways are formed in, and are spaced circumferentially around, the body 66 from each other. The air passageways are substantially larger than the water passageways and are designated by reference numerals 70, 72 and 74, with the water passageways being designated by reference numerals 76, 78 and 80. The air passageways 70–74 and water passageways 76–80 do not extend the full length of the body 66, but terminate in the section line 7—7 shown in FIGURE 3, where these passageways communicate with radially extending ports which in turn comunicate with the bore 68 through the cylindrical body 66. The radially extending ports which communicate with the several axial air and water passageways are designated by reference numerals 70a, 72a, 74a, 76a, 78a and 80a. In the fabrication of the valve, the radially extending ports 70a–80a can be drilled through the body 66 from the outside thereof, and the outer portions of these passageways then closed by suitable plugs 82 as shown in FIGURE 7.

At the end of the cylindrical body 66 at which the axially extending air and water passageways 70–80 open, a plurality of nipples are pressed into these passageways and function to permit the connection of flexible conduits to the valve 50. In FIGURE 3, the nipples which are connected to the various air and water axial passageways within the body 66 are designated by the reference numeral corresponding to their respective passageway, followed by the subscript b. Thus, nipples 70b–80b are provided for permitting air and water conduits to be connected to the passageways 70–80. It will be noted that each of the nipples 70b–80b are provided with frusto-conical collars to retain by frictional engagement, the flexible air and water conduits which are pressed thereover. It will also be noted that the nipples for connection of the air conduits are larger than those required to convey water from water-carrying conduits to the respective water passageways 76–80 within the valve body 76.

At the opposite end face of the cylindrical body 66 from the end face which carries the nipples 70b–80b, the body is provided with an arcuate groove 84 which extends circumferentially in the body and covers approximately 120° of arc. This end face of the body 66 also is provided with a plurality of circumferentially spaced, hemispherical indentations 86, 88 and 90 which are used in cooperation with a spherical member or ball, as hereinafter explained, for indexing the valve to different positions during its operation.

Figure 5:
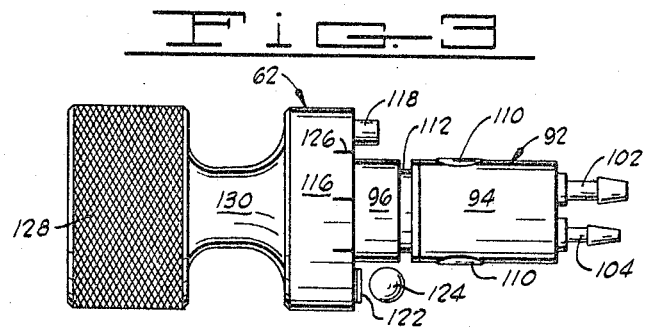
FIGURE 5 is a perspective view of the rotating portion of the valve with the stationary body or jacket removed from the valve.

The rotating core portion 62 of the valve is most clearly illustrated in FIGURE 5 of the drawings, and includes a movable valve member 92 which is generally cylindrical in configuration, and is dimensioned to fit snugly within the cylindrical bore 68 of the valve body 66. The movable valve member 92 includes a cylindrical outer shell 94 which is pressed on an inner core 96. The inner core 96 contains a pair of parallel, axially extending fluid flow passageways 98 and 100 for the accommodation of air and water, respectively. At the planar end face of the movable valve member 92 at which the passageways 98 and 100 open, a pair of conduit engaging nipples 102 and 104 are pressed into the pasageways 98 and 100, respectively, to permit air and water lines to be connected to, and placed in communication with the passageways 98 and 100.

In a plane extending transversely across the movable valve member 92 and identified by the section line 7—7 in FIGURE 3, a pair of diametrically opposed ports 98a and 100a extend radially outwardly in the inner core 96 of the movable valve member 92, and open into circular apertures 106 and 108 formed in the cylindrical outer shell 94. A pair of O-rings 110 are placed in each of the circular apertures 106, 108, and bear against the inner walll of the cylindrical bore 68 through the cylindrical body 66 when the movable valve member 92 is rotatably mounted in operative position within the cylindrical body. It will be noted in referring to FIGURE 7 that the radially expending ports 98a and 100a and the corresponding circular apertures 106 and 108 formed in the movable valve member 92 are arranged to register with selected pairs of the radially extending ports 70a–80a as the rotating core portion 62 of the valve is rotated about its longitudinal axis. Thus, the passageways 98 and 100 can be placed in communication with a selected pair of air and water passageways formed in the valve body 66 by rotation of the rotating core portion 62 of the valve.

The inner core 96 of the movable valve member 92 is of enlarged diameter at a point even with the inner end of the cylindrical outer shell 94, such enlarged diameter being equivalent to the outside diameter of the shell and providing a shoulder against which the shell abuts as shown in FIGURE 5. At a position which is in axial alignment, when the valve is assembled with the threaded, radially extending aperture which receives the key screw 70, the enlarged diameter portion of the inner core 96 of the movable valve member 92 is grooved or channeled as indicated by reference numeral 112 to accommodate the inner end of the key screw 70 and prevent axial movement between the rotating core portion 62 and the fixed or stationary jacket portion 64 when the valve is assembled. Formed integrally with, welded to, or otherwise suitably secured to the movable valve member 92 at its end opposite the end carrying the nipples 102 and 104 is a cap portion 116. The cap portion 116 is of substantially the same diameter as the cylindrical body 66 of the stationary jacket portion 64 and is provided with an axially extending pin 118 positioned adjacent its outer peripheral edge. When the valve is assembled with the rotating core portion 62 positioned within the stationary jacket portion 64 in the manner illustrated in FIGURE 3, the pin 118 engages the arcuate groove 84 in the cylindrical body 66 and limits the arc through which the rotating core portion may be rotated with respect to the stationary jacket portion.

Positioned diametrically opposite to the pin 118 on the cap portion 116 of the rotating core portion 62 of the valve is a small axial bore 120 which accommodates a helical spring 122. A small spherical member or ball 124 bears against the spring 122 and, when the valve is assembled, depresses the spring into the bore 120 (see FIGURES 5 and 9). The ball 124 then bears against, and rides around, the flat or planar end surface of the cylindrical body 66 and will snap into or engage the hemispherical depressions 86, 88 and 90 formed in this end face. The cap portion 116 and body 66 can conveniently carry indexing indicia 126 which permit the dentist to visually observe the particular operating position to which the valve 50 is brought by rotation of the rotating core portion 62 thereof in the stationary jacket portion 64.

A suitable operator, such as a knob or handle, is connected to the cap portion 116 and is used for digitally rotating the core portion 66 of the valve. In the illustrated embodiment, the operator provided is a knurled knob 128 which is connected to the cap portion 116 by a constricted neck 130.

OPERATION

In the operation of the novel control valve 50 of the improved dental operatory in which it is incorporated, the valve is first pressed into position in the circular opening or aperture 44 in the instrument support member 32. The valve 50 may be firmly retained in position in the instrument support member 32 by a set screw or other suitable retention member. When the valve 50 is properly positioned in the instrument support member 32, the planar faces of the rotatable core member 62 and of the cylindrical shell portion 64 which carry the nipples 70b–80b, and 102 and 104 are positioned on one side of the instrument support member, and the cap portion 116 of the rotating core portion 62, as well as the knurled knob 128 are positioned on the opposite side of the instrument support member 32. Thus, when the air and water supply conduits 16 and 18, and the air and water conduits which interconnect the nipples 70b–80b to the several dental instruments 54, 56 and 58 are connected to the valve, all of these conduits are disposed on the opposite side of the instrument support member 32 from the knurled knob 128.

After the valve has been positioned in the instrument support arm 32, and the air and water supply conduits 16 and 18 have been extended upwardly through the hollow interiors of the vertical standard 12 and the horizontal arm 14, these conduits are connected to the nipples 102 and 104 at the back of the valve, and the nipples 70b–80b are also connected to pairs of air and water conduits leading to the several dental instruments. The system is now ready for operation.

It will be understood that a master supply valve for controlling the rate of flow of air and water through the air and water supply conduits 16 and 18 is provided at some point between the source of supply of these fluids and the control valve 50. This master valve (not shown) can take the form of a foot pedal operated by the dentist, or any other suitable valve easily accessible to the dentist. Let it be assumed that in the initial operation to be performed on the patient's teeth, the dentist will utilize the dental instrument 54. Having made this choice of instruments, it is necessary for the dentist to use the control valve 50 to connect the fluid supply conduits 16 and 18 to the proper pair of air and water conduits leading to the instrument 54. This is accomplished by rotating the rotatable core portion 62 of the valve within the stationary jacket portion 64 so that the proper pair of air and water passageways of the group designated by reference numeral 70–80 within the valve body 66 are aligned with the radial ports 98a and 100a which communicate with the axial passageways 98 and 100 in the movable valve member 92. The three positions in which the movable valve member 92 can be positioned in the valve body 66 so that its axial passageways 98 and 100 are aligned with a selected pair of axial passageways in the valve body 66 is determined by the three positions of registration of the ball 124 with the hemispherical depressions 86, 88 and 90 in the planar end face of the valve body 66. The spring 122 will bias the ball 124 into these hemispherical depressions as the dentist rotates the knurled knob 128 and the dentist receives, by means of the sense of touch, an indication of when the movable valve member 92 is in proper alignment within the body 66 to provide registration with one of the pairs of ports. The indicia 126 provided on the cap portion 116 in conjunction with the reference or index mark formed on the valve body 66 also provide a visual indication to the dentist of the position of the movable valve member 92 within the valve body 66. Thus, the three indicia marks 126 can be made to correspond to the three dental instruments 54, 56 and 58, and by proper alignment of these marks with the reference mark on the valve body 66, the dentist is assured that the fluid supply conduits 16 and 18 are placed in communication with the desired discharge conduits to the proper dental instrument through the several passageways and ports within the control valve 50.

It will be noted that during the dentist's manipulation of the control valve 50, no interference with such manipulation is provided by the air and water supply conduits 16 and 18, or by any of the conduits which interconnect the valve with the dental instruments. All of these conduits are located to the rear of the instrument support members 32 and out of the way of the area of digital manipulation by the dentist. Further than this, the valve 50 can be very easily operated with the thumb and index finger, and, after a short period of operation, can be operated by the sense of touch alone. The possibility of erroneous use of the valve is minimized or eliminated by the provision of the arcuate limiting slot 84 in the planar end face of the valve body 66 which, through engagement of the axially extending pin 118, prevents rotation of the rotatable core portion 62 beyond that arc which is necessary for selection of a desired pair of fluid discharge conduits.

The dental operatory with its several degrees of freedom of motion, and particularly, by virtue of the inclusion of the universal or ball and socket joint 28 between the horizontal arm 26 and the short swivel arm 30, permits the dental instruments and the control valve 50 to be shifted to substantially any position desired by the dentist. When it is desired to repair or replace the valve 50, it may be very easily detached or removed from the instrument support member 32, and can be easily disassembled by the removal of the set screw 70 to permit the rotatable core portion 62 to be withdrawn from the stationary jacket portion 64.

From the foregoing description of the invention, it will be apparent that a highly useful and improved dental operatory has been provided which includes a control valve for controlling the flow of air and water to the several dental instruments which may be employed, which valve is very easily utilized, and can be economically manufactured.

I claim:

1. A dental operatory comprising, in combination:
   a hollow, vertically extending standard;
   a hollow, horizontal arm pivotally mounted on said standard for pivotation about a vertical axis;
   a second arm pivotally connected to said first mentioned arm;
   a swivel arm;
   a universal joint interconnecting said swivel arm to said second arm to permit universal relative movement between the second arm and the swivel arm;
   an elongated instrument support member connected to said swivel arm and having a plurality of apertures extending transversely therethrough;
   a plurality of dental instruments detachably supported on said instrument support member in said apertures;
   a pair of fluid supply conduits extending through the hollow interiors of said hollow, vertically extending standard and hollow, horizontal arm;
   a generally cylindrical fluid control valve mounted on said instrument arm in one of said apertures and extending transversely through said instrument support member, said valve comprising;
   a fixed cylindrical shell extending through the aperture in said instrument support member and secured in said instrument support member against movement relative thereto, said shell including a valve body having;
   a pair of spaced, parallel, substantially planar end faces disposed on the opposite sides of said instrument support member;
   an elongated cylindrical bore extending through the valve body from one planar end face to the other;
   a plurality of parallel, circumferentially spaced, elongated fluid discharge passageways extending axially in said body and parallel to the cylindrical bore therethrough, said fluid discharge passageways opening in one of the planar end faces of said valve body and extending a part of the way to the other planar end face thereof; and
   a radial port interconnecting each of said fluid discharge passageways with the cylindrical bore in said valve body;
   an elongated, rotatable, cylindrical core portion rotatably mounted in the cylindrical bore of said valve body and having
   a planar end face disposed on the same side of said instrument support member as said one planar end face of the valve body in which said fluid discharge passageways open;
   a handle on the end of said rotatable core portion opposite its end face and located on the opposite side of said instrument support member therefrom;
   a pair of elongated, parallel, axially extending fluid supply passageways extending into said core portion from the planar end face thereof;
   a radial port extending from each of said fluid supply passageways to the outer peripheral surface of said rotatable, cylindrical core portion, the radial ports in said core portion being positioned for selective concurrent registration with pairs of the radial ports in said valve body;
   means preventing axial movement between said valve body and said rotatable core portion; and
   indexing means cooperating with said valve body and said rotatable core portion and providing a tactile indication of the registration of the radial ports in said core portion with a pair of the radial ports in said valve body; and
   a pluralty of pairs of fluid conduits interconnecting said fluid control valve and said dental instruments.

2. A dental operatory as claimed in claim 1 wherein said indexing means comprises:
   a plurality of circumferentially spaced, hemispherical depressions on the planar end face of said valve body which is on the same side of said instrument support member as the handle on said core portion;

a metallic ball sized to mate with said depressions; and
resilient means carried by said core portion and resiliently biasing said metallic ball against the depression-carrying end face of said valve body and sequentially into said depressions as said core portion is rotated.

3. A dental operatory as claimed in claim 2 and further characterized to include an arcuate slot in the depression-carrying end face of said valve body; and
a pin secured to said rotatable core portion and projecting into said arcuate slot whereby rotation of said core portion in said valve body is restricted to less than one complete revolution.

4. A dental operatory comprising, in combination:
a vertically extending standard;
a horizontal arm pivotally mounted on said standard for pivotation about a vertical axis;
a second arm pivotally connected to said first arm;
a swivel arm;
a universal joint interconnecting said swivel arm to said second arm to permit universal relative movement between said second arm and said swivel arm;
an instrument support member connected to said swivel arm;
a plurality of dental instruments detachably supported on said instrument support arm;
a fluid control valve detachably mounted on said instrument support arm, said fluid control valve comprising:
a valve body having a pair of spaced, parallel end faces disposed on opposite sides of the instrument support member, and having a cylindrical bore extending therethrough between said end faces, said valve body further having a plurality of pairs of axially extending passageways therein extending parallel to said cylindriacl bore and communicating through ports with said cylindrical bore, said passageways opening into said valve body at one of said end faces; and
a rotatable core portion rotatably mounted in said bore and having a planar end face in coplanar alignment with said one end face of the valve body in which said passageway openings are located, said core portion further having a pair of axially extending passageways therein and ports positioned therein for placing said second mentioned, core-carried axially extending passageways in fluid communiction with the first mentioned, valve body-carried axially extending passageways through said ports disposed in said valve body, said pair of passageways in said rotatable core portion opening in the planar end face thereof which is in coplanar alignment with said one end face of the valve body, said rotatable core portion further including a valve operator positioned at the opposite end of said core portion from said planar end face thereof and positioned on the opposite side of said instrument support member from said planar end faces;
a pair of fluid supply conduits extending along, and supported by, said vertically extending standard and said horizontal arm and connected to the passageways in said core portion at their openings in said one planar end face of the core portion; and
a plurality of pairs of fluid conduits interconnecting said dental instruments with said passageways in said valve body where said passageways in said valve body open in said one end face thereof, said plurality of pairs of conduits being arrayed around the pair of conduits connected to the passageways in said core portion.

5. A dental operatory as defined in claim 4 wherein said standard and horizontal arm are hollow, and said pair of fluid supply conduits extends through the hollow interior of said standard and horizontal arm.

6. A dental operatory comprising, in combination:
a vertically extending standard;
a horizontal arm pivotally mounted on said standard for pivotation about a vertical axis;
a second arm pivotally connected to said first arm;
a swivel arm;
a universal joint interconnecting said swivel arm to said second arm to permit universal relative movement between the second arm and swivel arm;
an elongated instrument support member connected to said swivel arm;
a plurality of dental instruments detachably supported on said instrument support member;
a fluid control valve mounted on said instrument support arm and comprising:
a fixed cylindrical shell portion extending through said instrument support member and provided with a plurality of pairs of fluid discharge passageways having openings in said shell on one side of said instrument support member; and
a rotatable core portion rotatably mounted in said cylindrical shell portion and provided with a pair of fluid supply passageways openings on said one side of said instrument support member, said core portion having an operating knob located on the opposite side of said instrument support member from the openings of said fluid supply and discharge passageways; and
means in said shell portion and said rotatable core portion for selectively placing a chosen pair of said discharge passageways in communication with said pair of fluid supply passageways;
means detachably retaining said shell portion of said control valve in said instrument support member;
a pair of fluid supply conduits extending along, and supported by, said vertically extending standard and said horizontal arm and connected to said pair of fluid supply passageways at their opening on one side of said instrument support member; and
a plurality of pairs of fluid conduits interconnecting said dental instruments with said fluid discharge passageways at their openings in said shell on said one side of said instrument support member.

7. A dental operatory as defined in claim 6 and further characterized to include:
means for limiting the rotational movement of said rotatable core portion in said fixed cylindrical shell to less than one complete rotation; and
indexing means for providing a tactile indication of the points in the rotation of said core portion at which said supply passageways are placed in communication with each pair of fluid discharge passageways.

8. A dental operatory as claimed in claim 7 and further characterized to include key means for preventing axial movement between said rotatable core portion and said fixed cylindrical shell.

9. A valve comprising:
a valve body having a cylindrical bore therethrough and having
a plurality of pairs of axially extending passageways spaced circumferentially from each other therein around said bore, and extending parallel to said bore and to each other, said passageways being spaced radially outwardly from said bore and extending from one end of said valve body over a portion of the length thereof; and
spaced radial ports extending radially outwardly in said valve body from said cylindrical bore and each placing one of said passageways in communication with said cylindrical bore; and
a rotatable valve core having a cylindrical portion rotatably positioned in said cylindrical bore in said valve body, said cylindrical portion having an end terminating in coplanar alignment with said end of said valve body;
a pair of axially extending passageways therein each opening in said end of said cylindrical portion, each of said passageways being parallel to, and substantially coextensive in length with, said first mentioned passageways in said valve body; and
radial ports extending radially outwardly from each of the passageways in the cylindrical portion of said rotatable valve core, said radial ports in said core extending radially outwardly from the axially extending passageways in said valve core and being oriented relative to the spaced radial ports in said valve body so that the radial ports extending radially outwardly from the axially extending passageways in said valve core will each simultaneously register with at least one pair of said spaced radial ports in said valve body as said valve core is rotated in said valve body.

10. A valve as defined in claim 9 and further characterized to include means for limiting the rotation of said valve core in said valve body to less than one complete revolution.

11. A valve as defined in claim 9 and further characterized to include a nipple secured in the open end of each of said passageways, said nipples all projecting from said coplanar ends of said valve body and cylindrical portion.

12. A valve as defined in claim 9 and further characterized to include sealing means positioned between said valve body and the cylindrical portion of said valve core and secured around the opening of each of the radial ports in the cylindrical portion of said valve core for movement with said cylindrical portion during its rotation relative to said valve body.

13. A valve as defined in claim 10 wherein said means for limiting the rotation of said valve core in said valve body comprises:
an arcuate slot formed in said valve body in a plane extending normal to the axis of the cylindrical bore therethrough; and
a pin carried by said valve core engaging said arcuate slot and movable from one extremity thereof to the other as said valve core is rotated relative to said valve body.

14. A valve as defined in claim 9 wherein said valve body is characterized in having a planar end face opposite said one end thereof and extending normal to the longitudinal axis of said cylindrical bore, said planar end face having a plurality of circumferentially spaced, hemispherical depression therein,
and wherein said rotatable valve core has a cap portion thereon having a face bearing against said planar end face, said cap portion having an axial bore therein positioned to register with said depressions;
and wherein said valve further includes indexing means providing a tactile indication of when, during the rotation of said valve core, the pair of radial ports in said cylindrical portion register with a pair of radial ports in said valve body, said indexing means comprising:
a resilient member in said axial bore, and
a ball of smaller diameter than said axial bore biased by said resilient member into contact with the planar end face of said valve body for selective engagement with said hemispherical depressions as said valve core is rotated relative to said valve body.

15. A valve as defined in claim 9 and further characterized to include:
handle means connected to said cap portion on the opposite side thereof from said valve body;
a nipple secured in the open end of each of said passageways, said nipples all projecting from the coplanar ends of said valve body and cylindrical portion; and
means for preventing axial movement between said rotatable valve core and said valve body.

References Cited
UNITED STATES PATENTS

| 3,021,869 | 2/1962 | Ross | 137—625.47 |
| 3,346,957 | 10/1967 | Maurer et al. | 32—22 |

ROBERT PESHOCK, Primary Examiner.

U.S. Cl. X.R.
137—625.47